United States Patent Office 3,801,676
Patented Apr. 2, 1974

3,801,676
POLYETHERPOLYTHIOLS, METHOD OF PREPARATION AND MIXTURES OF POLYTHIOETHER-POLYTHIOLS WITH EPOXIDE RESINS
Richard A. Hickner, Midland, Mich., assignor to The Dow Chemical Company, Midland, Mich.
No Drawing. Original application Oct. 29, 1968, Ser. No. 771,648, now abandoned. Divided and this application Aug. 12, 1971, Ser. No. 171,332
Int. Cl. C07f 9/02
U.S. Cl. 260—928     14 Claims

ABSTRACT OF THE DISCLOSURE

Polythioetherpolythiols with a thiol functionality greater than 2 are made by reacting a polythiol with a triene, a tetraene or mixtures thereof or mixtures of the polyenes with a diene, in the presence of a free radical generating catalyst. The polythioetherpolythiols can be reacted with epoxide resins to effect cures of the latter.

CROSS REFERENCE TO RELATED APPLICATIONS

This application is a division of my application Ser. No. 771,648, filed Oct. 29, 1968, now abandoned.

SUMMARY OF THE INVENTION

This invention relates to new polythioetherpolythiols which are made by reacting a dithiol with a compound having 3 to 5 olefinically unsaturated linkages or groups, or a mixture of at least one of said compounds with a diolefinically unsaturated compound preferably in the presence of a free-radical initiating catalyst. The new polythioetherpolythiols have a thiol functionality greater than 2.05 and preferably have a functionality of 2.2 to 4.

The new compounds can be aliphatic, or they can contain cycloaliphatic, or aromatic groups.

The polyene reactant can be derived from an aliphatic hydrocarbon, an aromatic hydrocarbon such as a phenyl, biphenyl or naphthyl group, an alkylidene biphenyl group, a poly(vinyl) or polyallyl ether of a polyol having 3 to 12 C atoms and 3 or more vinyl or allyl ether groups, a heterocyclic N containing group, or an oxygenated pentavalent P group. The unsaturated group can be attached to any of the above groups either through a carbon or through an oxygen linkage.

DETAILED DESCRIPTION OF THE INVENTION

Polythioetherpolymercaptans having an average of from about 2.05 to 4 or more thiol groups per molecule have been unknown prior to this invention. I have found that a very wide variety of polythioetherpolymercaptans can be made by reacting one or a mixture of polyenes with one or a mixture of polymercaptans, in a molar ratio such that there are more mercapto groups in the reaction mixture than carbon to carbon double bonds, in the presence of a free radical initiator as a catalyst. The polymercaptan will add across the carbon to carbon double bond and terminate in a free mercapto group.

The individual polyenes which can be reacted have at least 3 olefinically unsaturated sites. Alternatively, mixtures of such polyolefinically unsaturated compounds with diolefins or more highly unsaturated olefins can be employed to make the new compositions of the invention. The polyenes may contain other groups which are non-reactive with thiol or olefinic groups such as hydroxyl, chloro, bromo, cyano, carboalkoxy, or carbamido.

The polymercaptans can contain from 2 to 4 mercapto groups. The polymercaptan can be aliphatic, cycloaliphatic, aromatic or heterocyclic. The carbon atoms in the aliphatic, cycloaliphatic, aromatic or heterocyclic polymercaptans can be substituted with any other group which will not react with the olefinic unsaturation. Thus, the substituents can be halogens, alkyl groups, alkoxy groups, aroxy groups, or cyano groups.

Representative polymercaptans have the generic formula $Y(SH)_n$ where Y is the non-reactive portion of the molecule and $n$ is an integer of 2 to 4 as defined above. Typical polymercaptans include ethanedithiol, propanedithiols, butanedithiol, pentanedithiol, hexanedithiol, heptanedithiols, octanedithiols, nonanedithiols, decanedithiols, benzene dithiols, tolyl dithiols, xylyl dithiols, cyclohexyl dithiols, ethyl cyclohexyldithiol, $\alpha,\alpha'$-dimercapto-p-xylene, $\beta,\beta'$-dimercaptodiethylether, $\beta,\beta'$-dimercaptodiethylsulfide.

Typical trienes which can be employed include 1,2,4 trivinylcyclohexane, triallylcyanurate, triallylisocyanurate, triallylphosphite, triallylphosphate, 1,2,3 triallyloxypropane, triallyl ethers of trimethylolpropane or pentaerythritol, 2,6-diallyl-1-allyloxybenzene, 1-allyloxy-2,4-diallyl-6-methoxybenzene, triallyltrimesate, triallylacetyl citrate or any other triene having up to 30 C atoms.

Representative tetraenes include 1,4 diallyloxy-2,5-diallyl benzene, 2,2'-bis(4-allyloxy-3-allylphenyl) propane, tetraallyl ether of pentaerythritol, 1,3-diallyloxy-4,6-diallylbenzene.

Examples of dienes which can be utilized as coreactants with the trienes or tetraenes include 1,5-hexadiene, 4-vinylcyclohexene, d-limonene, dipentene, divinylbenzene, diallyl ethers of polyhydric alcohols particularly polyhydric alkanols containing from 2–10 carbon atoms such as a diallyl ether of glycerol, a diallyl ether of pentaerythritol, the diallyl ether of ethylene glycol or esters, such as diallyl phthalate, or diallyl adipate.

The reaction can be initiated by any free-radical source, such as the organic peroxides or hydroperoxides, examples of which are benzoyl peroxide or t-butyl hydroperoxide, the azonitriles, such as azoisobutyronitrile or, if catalyst contaminants are to be avoided, the initiator can be a radiation source such as ultraviolet light or gamma radiation, such as a cobalt 60 source. If the radiation sources are used as catalysts, the reaction can be run at ambient temperature, but with peroxides, hydroperoxides or azonitriles the reaction temperature must be approximately the decomposition temperature of the organic catalyst. Generally a temperature range of from 50 to 150° C. can be used, depending primarily on the catalyst used.

The reaction can be carried out at atmospheric pressure, under a superimposed pressure or under vacuum. Since pressure appears to have no effect on the reaction, it is preferred to operate at ambient pressure at the reaction temperature used.

Because of the complexity of the reaction, the exact structure of the final products is not known with certainty. Thus, for example, if trivinyl cyclohexane is reacted with ethanedithiol the following courses could result.

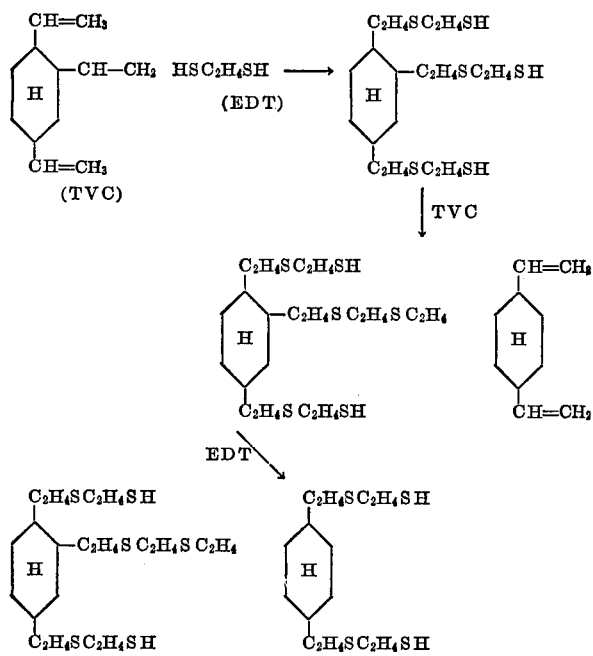

With other trienes or tetraenes some telemorization can also occur by bridging of two or more molecules of the triene or tetraene through a thioether linkage.

The higher the equivalent ratio of dithiol the more tri-(thioetherthiol) will be formed. In practice, however, some of the higher molecular weight products will also be formed.

The proportions of the reactants can vary somewhat, but it is preferable to have at least 1.1 equivalent of —SH per double bond, and up to about 10 equivalents of —SH per double bond. Higher molar —SH ratios can be used but they will not react and serve only as diluents. In running the reaction it is preferable to add the triene or tetraene or mixture thereof or mixtures containing a diene to the polythiol. However, the polyene and the polythiol can be added simultaneously into the reaction chamber, if desired.

The products formed are all liquids having viscosities from about 2 poises up to such high viscosity that measurement with a Gardner viscometer cannot be made.

The examples which follow are intended to illustrate, but not to limit the invention. All parts are by weight unless otherwise indicated.

EXAMPLE 1

A two liter round-bottom flask was charged with 643 parts of 1,2-ethanedithiol and 1 part of azobisisobutyronitrile. The mixture was heated to 70° C. and 185 parts of 1,2,4-trivinylcyclohexane were added slowly over a four hour period. An additional part of azobisisobutyronitrile was added and the mixture was held at 70° C. for nine more hours. The product was charged to a flash still and 338 parts of unreacted ethanedithiol were removed by distilling to a pot temperature of about 100° C. at 0.1 mm. pressure. The residue was filtered to yield 448 parts of a product analyzing 15.6% —SH. It had a Gardner viscosity of X or about 12.9 poises.

EXAMPLE 2

The procedure employed in preparing polythioether-polymercaptans was the same as that described in Example 1.

Tabulated below are the data obtained from several runs, using various trienes and tetraenes with ethanedithiol and propanedithiol. Viscosity data, percent total sulfur, and SH equivalent weight are included in the table.

TABLE I

| Olefin | | Grams Ethane-dithiol | Yield of product | Viscosity, poise | —SH, eq. wt. | Percent | |
|---|---|---|---|---|---|---|---|
| Grams | Name | | | | | S by wt. | —SH |
| 243 | 1,2,4-trivinylcyclohexane | 848 | 640 | | | | |
| 185 | do | 643 | 450 | 12.9 | 206 | | 16.0 |
| 182.5 | do | 964 | 467 | 8.5 | 180 | | 18.0 |
| | do | 188 | 130 | 12.9 | 200 | 40.4 | 16.6 |
| 40.5 | 1,4-diallyloxy-2,5-diallylbenzene | 180 | 68 | ~32 | 241 | 33.6 | 13.7 |
| 28.1 | 2,2'-bis(4-allyloxy-3-allylphenyl) propane | 56 | 45 | (a) | 306 | 26.9 | 10.8 |
| 83 | Triallylcyanurate | 188 | 147 | ~123 | 223 | 33.0 | 14.8 |
| 80 | Triallylisocyanurate | 188 | 142 | (a) | 252 | 31.9 | 13.1 |
| 69 | Trivinylisocyanurate | 188 | 140 | (a) | 225 | 34.2 | 14.7 |
| 73 | Triallylphosphate | 188 | 134 | ~25 | 227 | 34.5 | 14.6 |
| 71 | 1,2,3-triallyloxypropane | 189 | 154 | 2.15 | 192 | 36.3 | 17.15 |
| 178 | do | 235 | 354 | 12.9 | 252 | 35.6 | 13.1 |
| 142 | do | b 414 | 335 | 2.9 | 246 | 34.2 | 13.4 |
| 98 | do | c 283 | 200 | 2.0 | 212 | 33.8 | 15.6 |
| 214 | 2,6-diallyl-1-allyloxybenzene | 564 | 444 | 10.7 | 206 | 35.0 | 16.0 |
| 271 | Allyl ether of pentaerythritol having an avg. of 3.29 allyl groups | 619 | 541 | | 225 | 33.5 | 14.7 |
| 270 | Allyl ether of pentaerythritol having an avg. of 3.77 allyl groups | 658 | 563 | | 228 | 35.2 | 14.5 | a Very viscous.
b 1,3-propanedithiol used.
c 1,2-propanedithiol used.

TABLE II

| Olefin A (moles) | Olefin B (moles) | Moles HSCH₂CH₂SH | Wt. of prod. (g.) | Viscosity, poise | —SH, eq. wt. | Analysis, percent | |
|---|---|---|---|---|---|---|---|
| | | | | | | S | SH |
| 4-vinylcyclohexene (0.30) | Triallylcyanurate (0.30) | 3.0 | 226 | ~17.6 | 206 | 36.4 | 16.0 |
| d-Limonene (0.30) | do | 3.0 | 225 | 22.7 | 219 | 34.3 | 15.1 |
| 4-vinylcyclohexene (0.25) | 1,2,4-trivinylcyclohexane (0.375) | 1.0 | 145 | (a) | | | |
| d-Limonene (0.25) | 2,2-bis(4-allyloxy-3-allylphenyl)propane (0.25) | 2.7 | 236 | 98.5 | 245 | 31.0 | 13.5 |
| d-Limonene (0.375) | 2,2-bis(4-allyloxy-3-allylphenyl)propane (0.125) | 2.5 | 189 | 10.7 | 220 | 32.8 | 15.0 |
| 1,2,3-triallyloxypropane (0.50) | 2,2-bis(4-allyloxyphenyl)propane (0.50) | 5.0 | 414 | 7.0 | 228 | 30.0 | 14.5 |
| 1,2,3-triallyloxypropane (0.33) | 2,2-bis(4-allyloxy-3-allylphenyl)propane (0.33) | 4.0 | 371 | 32.0 | 231 | 32.8 | 14.3 | a Very viscous.

The polythioetherpolythiols described herein are useful for curing epoxy resins. In each of the following tests a reaction product of a triene or tetraene or mixtures with a diene and ethanedithiol was blended in equivalent amounts with a diglycidyl ether of bisphenol A having an epoxide equivalent weight of about 190. Tabulated below are data obtained on 15 mil thick films. Where cure did not begin immediately on mixing, the films were held at 40° F. until set.

TABLE III

| Polyene reacted with dithioethane | Wt. polythioetherpolythiol (g.) | SH, eq. wt. | Wt. diglycidyl ether of bisphenol A (g.) | Cure catalyst (g.) | Cure time (minutes) |
|---|---|---|---|---|---|
| 1,4-diallyloxy-2,5-diallyl benzene | 28.0 | 241 | 22.0 | a.66 | 165 |
| Triallylisocyanurate | 28.5 | 252 | 21.5 | a.65 | 1,140 |
| Do | 28.5 | 252 | 21.5 | b.65 | c 3 |
| Triallylcyanurate | 27.0 | 223 | 23.0 | b.69 | c 5 |
| Trivinylisocyanurate | 27.1 | 225 | 22.9 | b.69 | (d) |
| (CH$_3$)$_2$C(C$_6$H$_3$(o allyl)(allyl))$_2$ | 28.2 | 245 | 21.9 | b.66 | 13 |
| plus d-limonene (50/50 mol percent) | | | | | |
| Triallylcyanurate plus d-limonene (50/50 mol percent) | 26.7 | 219 | 23.3 | b.70 | 11 |
| Triallyl cyanurate plus 4-vinylcyclohexane (50/50 mol percent) | 26.0 | 206 | 24.0 | b.72 | 12 |
| Triallyloxypropane | 27.7 | 237.4 | 22.3 | b.67 | 15 |
| plus (CH$_3$)$_2$C(C$_6$H$_3$(o allyl)(allyl))$_2$ | | | | | |
| Triallyloxypropane (50/50 mol percent) | 25.1 | 192 | 24.9 | b.75 | 11 | a Benzyl dimethyl amine.
b Tetramethyl guanadine.
c Started to exotherm in bottle while mixing.
d Cured while mixing.

The cured films adhere well to glass, wood, or metal and thus can be used for coatings or for making self-supporting sheeting.

In another series of tests, bars ½ inch x ½ inch x 5 inches were prepared by mixing .75 equivalent of a diglycidyl ether of bisphenol A, having an epoxide equivalent weight of about 190, with an equivalent amount of a polythioetherpolythiol. The curing catalyst in all instances was benzyl-dimethylamine. The cure temperature was ambient. Tabulated below are the polymers reacted with a dithiol and the properties of the bars which resulted.

TABLE IV

| Polyene reacted | Dithiol | SH, eq. wt. | Shore A hardness | Physical properties |
|---|---|---|---|---|
| Triallyloxypropane | HSC$_2$H$_4$SH | 183 | 70 | Flexible. |
| Triallyloxypropane plus diallyl ether of bis-phenol A (50/50 mol percent) | HSC$_2$H$_4$SH | 228 | 65 | Very flexible. |
| Triallyloxypropane plus (CH$_3$)$_2$C(C$_6$H$_3$(o allyl)(allyl))$_2$ (50/50 mol percent) | HSC$_2$H$_4$SH | 231 | 98 | Slightly flexible, very tough. |
| Triallyloxypropane | CH$_3$\|HSCH$_2$CHSH | 212 | 62 | Very flexible. |
| Do | HSC$_2$H$_4$SH | 252 | 69 | Flexible. |
| Do | HS(CH$_2$)$_3$SH | 246 | 71 | Do. |

I claim:
1. The liquid reaction product of (A) a member selected from the class of triallyl phosphate and triallyl phosphite with up to 50 mol percent of a diene selected from the class of 1,5-hexadiene, 4-vinylcyclohexene, d-limonene, dipentene, divinylbenzene, diallylethers of polyhydric alkanals containing from 2–10 C atoms and 2 to 4 OH groups, diallyl adipate and diallyl phthalate with (B) a polythiol of the formula Y(SH)$_n$ wherein $n$ is an integer from 2 to 4 and Y is selected from the class of a saturated aliphatic hydrocarbon group having 2 to 10 C atoms, a phenylene group, a tolylene group, a xylylene group, a cyclohexyl group, an ethyl cyclohexyl group, a

—CH$_2$—C$_6$H$_4$—CH$_2$— group, a —(CH$_2$)$_2$O(CH$_2$)$_2$— group or a

—(CH$_2$)$_2$S(CH$_2$)$_2$— group in a ratio so as to provide at least 1.1 SH equivalents per unsaturated group of (A), the product being a polythioether polythiol having a thiol functionality greater than 2.05, the said reaction being carried out in the presence of a free radical generating catalyst, at a temperature from ambient temperature up to about 150° C.

2. The product of claim 1 in which (A) is triallyl phosphate.

3. The product of claim 1 in which (A) is triallyl phosphite.

4. The product of claim 1 in which Y(SH)$_n$ is a dithiol of 2–3 C atoms.

5. The product of claim 1 in which Y(SH)$_n$ is ethanedithiol.

6. The product of claim 1 in which (A) is a mixture of triallyl phosphate and 1,5 hexadiene and Y(SH)$_n$ is a dithiol of 2–3 C atoms.

7. The product of claim 1 in which (A) is a mixture of triallyl phosphate and 4-vinyl cyclohexene and Y(SH)$_n$ is a dithiol of 2–3 C atoms.

8. The product of claim 1 in which (A) is a mixture of triallyl phosphate and dipentene and $Y(SH)_n$ is a dithiol of 2–3 C atoms.

9. A product of claim 1 in which (A) is a mixture of triallyl phosphate and a diallyl ether of a polyhydric alkanol containing from 2–4 OH groups and 2–10 C atoms and $Y(SH)_n$ is a dithiol of 2–3 C atoms.

10. The product of claim 1 in which (A) is a mixture of triallyl phosphite and 1,5 hexadiene and $Y(SH)_n$ is a dithiol of from 2–3 C atoms.

11. The product of claim 1 in which (A) is a mixture of triallyl phosphite and 4-vinyl cyclohexene and $Y(SH)_n$ is a dithiol of from 2–3 C atoms.

12. The product of claim 1 in which (A) is a mixture of triallyl phosphite and d-limonene and $Y(SH)_n$ is a dithiol of 2–3 C atoms.

13. The product of claim 1 in which (A) is a mixture of triallyl phosphite and dipentene and $Y(SH)_n$ is a dithiol of 2–3 C atoms.

14. The product of claim 1 in which (A) is a mixture of triallyl phosphite and a diallylether of a polyhydric alkanol containing 2–4 OH groups and 2–10 C atoms and $Y(SH)_n$ is a dithiol of 2–3 C atoms.

References Cited
UNITED STATES PATENTS

| | | | |
|---|---|---|---|
| 3,625,925 | 12/1971 | Oswald et al. | 260—37 R X |
| 3,662,034 | 5/1972 | Oswald et al. | 260—948 X |
| 3,686,326 | 8/1972 | Oswald et al. | 260—948 X |

JOSEPH P. BRUST, Primary Examiner

U.S. Cl. X.R.

204—158; 260—47 EC, 248 R, 926, 929, 930, 948, 949, 956, 609

UNITED STATES PATENT OFFICE
CERTIFICATE OF CORRECTION

Patent No. 3,801,676            Dated April 2, 1974

Inventor(s) Richard A. Hickner

It is certified that error appears in the above-identified patent and that said Letters Patent are hereby corrected as shown below:

Column 1, line 21, delete "APPLICATIONS" and insert --APPLICATION--.

Column 3, in the formula, first occurrence, the benzene ring with the symbols "$CH_3$" at the top and bottom should read --$CH_2$-- and the single bond should be a double bond:

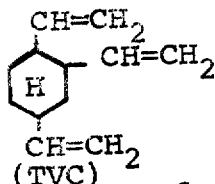

(TVC)

Column 3, in the formula, fourth occurrence, the benzene ring with the symbol "$CH_3$" at the top should read --$CH_2$--:

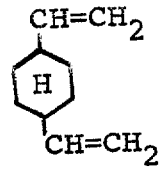

Column 5, line 73, delete "alkanals" and insert --alkanols--.

Signed and sealed this 10th day of September 1974

(SEAL)
Attest:

McCOY M. GIBSON, JR.
Attesting Officer

C. MARSHALL DANN
Commissioner of Pate